US009988945B2

(12) United States Patent
Mizoguchi et al.

(10) Patent No.: US 9,988,945 B2
(45) Date of Patent: Jun. 5, 2018

(54) APPARATUS FOR UTILIZING HEAT WASTED FROM ENGINE

(71) Applicant: SANDEN HOLDINGS CORPORATION, Isesaki-shi (JP)

(72) Inventors: Shinichiro Mizoguchi, Kanagawa (JP); Hiroyuki Nagai, Kanagawa (JP); Tomonori Haraguchi, Isesaki (JP)

(73) Assignee: SANDEN HOLDINGS CORPORATION, Gunma (JP)

( * ) Notice: Subject to any disclaimer, the term of this patent is extended or adjusted under 35 U.S.C. 154(b) by 38 days.

(21) Appl. No.: 15/311,378

(22) PCT Filed: May 14, 2015

(86) PCT No.: PCT/JP2015/063924
§ 371 (c)(1),
(2) Date: Nov. 15, 2016

(87) PCT Pub. No.: WO2015/174496
PCT Pub. Date: Nov. 19, 2015

(65) Prior Publication Data
US 2017/0107861 A1 Apr. 20, 2017

(30) Foreign Application Priority Data
May 15, 2014 (JP) .................. 2014-101768

(51) Int. Cl.
F01K 13/00 (2006.01)
F01K 25/14 (2006.01)
(Continued)

(52) U.S. Cl.
CPC ............ F01K 13/003 (2013.01); F01K 11/00 (2013.01); F01K 23/10 (2013.01); F01K 23/14 (2013.01);
(Continued)

(58) Field of Classification Search
CPC ........ F01K 11/00; F01K 13/003; F01K 23/06; F01K 23/065; F01K 23/10; F01K 23/14;
(Continued)

(56) References Cited

U.S. PATENT DOCUMENTS

2015/0047351 A1 2/2015 Ishikawa et al.
2015/0107253 A1 4/2015 Haraguchi et al.

FOREIGN PATENT DOCUMENTS

CN 103608548 2/2014
JP 2010-174848 8/2010
(Continued)

Primary Examiner — Audrey K Bradley
(74) Attorney, Agent, or Firm — Cozen O'Connor

(57) ABSTRACT

Apparatus for utilizing heat wasted from an engine includes first pressure detecting means (73) and first temperature detecting means (81) for detecting a pressure and a temperature in a refrigerant passage extending from a condenser (38) to a refrigerant pump (32), second pressure detecting means (72) and second temperature detecting means (82) for detecting a pressure and a temperature in a refrigerant passage extending from a heat exchanger (36) to an expansion device (37), and control means (71) responsive to these four detecting means when operating a Rankine cycle (31). Means (71) is for diagnosing whether or not an electromagnetic clutch (35) is stuck responsive to either the first pressure detecting means (73) and the first temperature detecting means (81), or the second pressure detecting means (72) and the second temperature detecting means (82).

6 Claims, 10 Drawing Sheets

(51) Int. Cl.
  *F01K 11/00* (2006.01)
  *F02G 5/02* (2006.01)
  *F16D 27/00* (2006.01)
  *F01K 23/10* (2006.01)
  *F01K 23/14* (2006.01)
  *G07C 5/08* (2006.01)

(52) U.S. Cl.
  CPC ............ *F02G 5/02* (2013.01); *G07C 5/0808* (2013.01); *F16D 27/00* (2013.01)

(58) Field of Classification Search
  CPC .......... F02G 5/02; F02G 5/04; F02G 2254/15; F02G 2260/00; G07C 5/0808; F16D 27/00; F01D 25/00; Y02T 10/166
  See application file for complete search history.

(56) References Cited

FOREIGN PATENT DOCUMENTS

| | | | |
|---|---|---|---|
| JP | 2010-203284 | 9/2010 | |
| JP | 2012-193690 | 10/2012 | |
| JP | 2012193690 A | * 10/2012 | ............ F01K 23/14 |
| JP | 2013-76370 | 4/2013 | |
| JP | 2013-100807 | 5/2013 | |
| JP | 2013-133752 | 7/2013 | |
| WO | WO 2012/124768 | 9/2012 | |
| WO | WO 2013/002017 | 1/2013 | |
| WO | WO 2013/046969 | 4/2013 | |
| WO | WO 2013/057991 | 4/2013 | |
| WO | WO 2013/099769 | 7/2013 | |
| WO | WO 2013/168683 | 11/2013 | |

* cited by examiner

APPARATUS FOR UTILIZING HEAT WASTED FROM ENGINE

RELATED APPLICATIONS

This is a U.S. National Phase Application under 35 USC 371 of International Application PCT/JP2015/063924 filed on May 14, 2015.

This application claims the priority of Japanese application no. 2014-101768 filed May 15, 2014, the entire content of which is hereby incorporated by reference.

TECHNICAL FIELD

The present invention relates to an improvement in an apparatus for utilizing heat wasted from an engine, and more particularly to diagnosis of sticking of an electromagnetic clutch in a case where the apparatus includes a transmission mechanism in which a refrigerant pump and an expansion device are disposed on an identical shaft and the shaft is coupled to a rotary shaft of the engine via the electromagnetic clutch.

BACKGROUND ART

There is an apparatus employing the Rankine cycle provided with a transmission mechanism in which a refrigerant pump and an expansion device are provided on an identical shaft and the shaft is coupled to a rotary shaft of an engine via an electromagnetic clutch, whereby rotation of the engine is assisted using power regenerated by the expansion device (see Patent Document 1). An expansion device rotation speed sensor that detects a rotation speed of the expansion device and a current sensor that detects a current flowing through an electromagnetic coil of the electromagnetic clutch are provided additionally in the apparatus. A diagnosis as to whether the electromagnetic clutch is stuck in an engaged condition or not is made on the basis of detection values detected by these sensors.

Patent Document 1: JP2012-193690A

SUMMARY OF INVENTION

Now, when an expansion device rotation speed sensor and a current sensor are provided additionally to diagnose sticking of an electromagnetic clutch like the technique described in Patent Document 1, an increase in cost occurs.

Therefore, it is an object of the present invention to provide an apparatus that can diagnose sticking of an electromagnetic clutch without providing an expansion device rotation speed sensor and a current sensor.

The present invention includes a Rankine cycle, and a transmission mechanism in which a refrigerant pump and an expansion device are disposed on an identical shaft and the shaft is coupled to a rotary shaft of an engine via an electromagnetic clutch that can be engaged and disengaged. Further, the present invention includes first pressure detecting means for detecting a pressure in a refrigerant passage extending from a condenser to the refrigerant pump, and first temperature detecting means for detecting a temperature in the refrigerant passage extending from the condenser to the refrigerant pump. Furthermore, the present invention includes second pressure detecting means for detecting a pressure in a refrigerant passage extending from a heat exchanger to the expansion device, and second temperature detecting means for detecting a temperature in the refrigerant passage extending from the heat exchanger to the expansion device. The present invention also includes control means that uses detection values detected by these four detecting means when operating the Rankine cycle. The above configurations are prerequisites of the present invention. Moreover, the present invention includes sticking diagnosis means for diagnosing whether the electromagnetic clutch is stuck in an engaged condition or not on the basis of the pressure and the temperature detected by either a couple constituted by the first pressure detecting means and the first temperature detecting means or a couple constituted by the second pressure detecting means and the second temperature detecting means.

According to the present invention, sticking of the electromagnetic clutch can be diagnosed using existing detecting means without providing an expansion device rotation speed sensor and a current detection sensor, and an increase in cost can thus be suppressed.

DESCRIPTION OF EMBODIMENTS

Hereinafter, embodiments of the present invention will be described with reference to the accompanying figures.

(First Embodiment)

Figure 1:
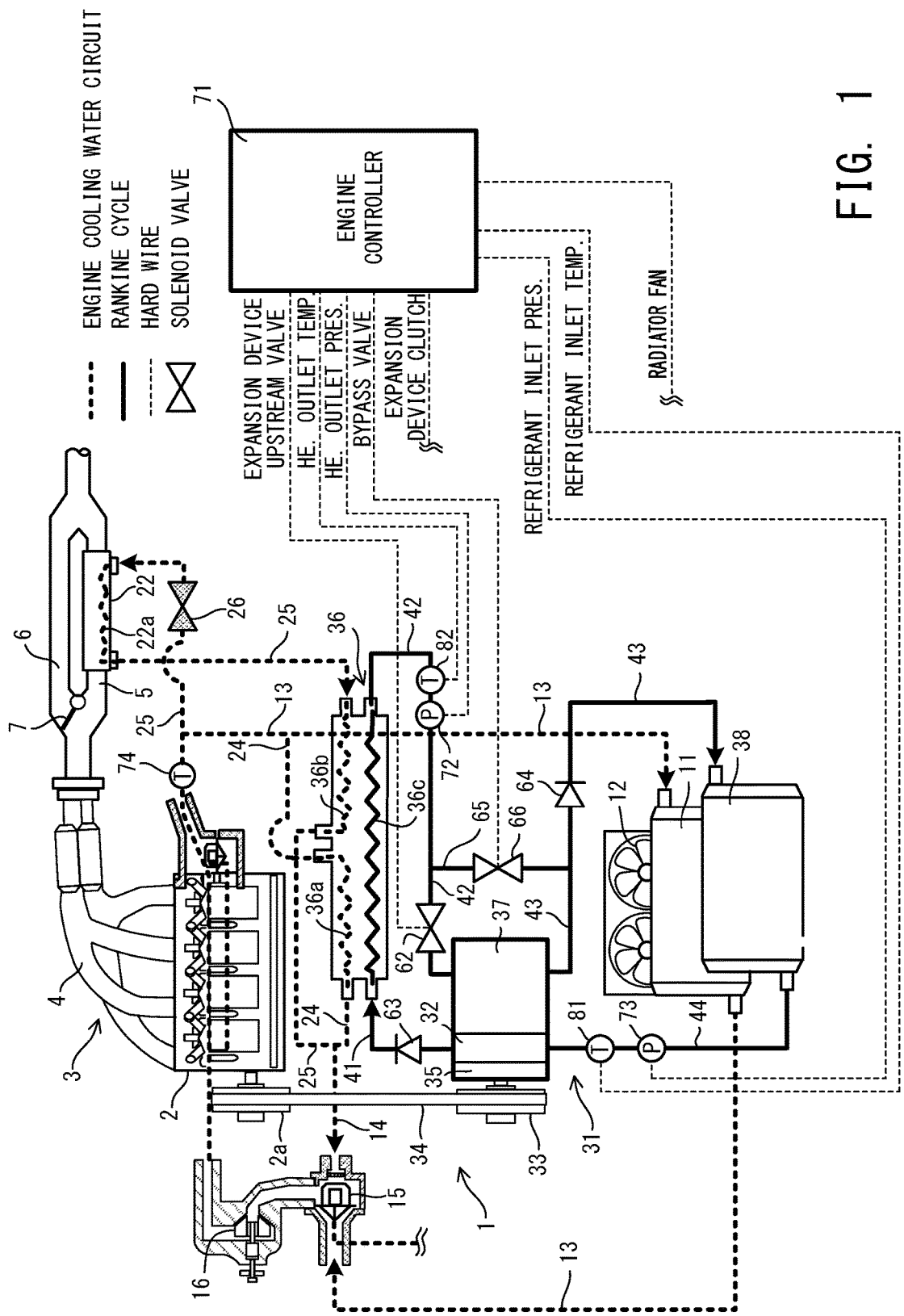
FIG. 1 is a schematic configuration view showing an overall system of a Rankine cycle according to a first embodiment of the present invention.

FIG. 1 is a schematic configuration view showing an overall system of a Rankine cycle according to a first embodiment of the present invention.

First, an engine cooling water circuit will be described. Cooling water exiting an engine 2 at approximately 80 to 90° C. flows separately through a cooling water passage 13 that passes through a radiator 11 and a bypass cooling water passage 14 that bypasses the radiator 11. The two flows then re-converge at a thermostat valve 15 for determining a distribution of cooling water flow rates at which the cooling water flows through the two passages 13, 14, and the cooling water is returned to the engine 2 via a cooling water pump 16. The cooling water pump 16 is driven by the engine 2 such that a rotation speed thereof is synchronized with an engine rotation speed.

The thermostat valve 15 relatively increases the amount of cooling water flowing through the radiator 11 by increasing a valve opening degree for the cooling water passage 13 side when a cooling water temperature is high, and relatively reduces the amount of cooling water flowing through the radiator 11 by reducing the valve opening degree for the cooling water passage 13 side when the cooling water temperature is low. When the cooling water temperature is particularly low, such as prior to warm-up of the engine 2, the radiator 11 is bypassed entirely such that all of the cooling water flows through the bypass cooling water passage 14 side. On the other hand, the valve opening degree for the bypass cooling water passage 14 side is never fully closed. When the cooling water flow rate through the radiator 11 increases, the flow rate of the cooling water flowing through the bypass cooling water passage 14 decreases in comparison with a case where all of the cooling water flows through the bypass cooling water passage 14 side. However, the thermostat valve 15 is configured so that the flow is not stopped completely.

The bypass cooling water passage 14 that bypasses the radiator 11 is constituted by a first bypass cooling water passage 24 and a second bypass cooling water passage 25. The first bypass cooling water passage 24 branches from the cooling water passage 13 so as to be connected directly to a heat exchanger 36 (which will be described later). On the other hand, the second bypass cooling water passage 25 branches from the cooling water passage 13 so as to be connected to the heat exchanger 36 after passing through a waste heat recovery device 22.

The heat exchanger 36 is provided in the bypass cooling water passage 14 in order to exchange heat with a refrigerant in a Rankine cycle 31. The heat exchanger 36 is formed by integrating a heater and a superheater. In other words, two cooling water passages 36a, 36b are provided substantially in series in the heat exchanger 36. Further, a refrigerant passage 36c through which the refrigerant of the Rankine cycle 31 flows is provided adjacent to the cooling water passages 36a, 36b so that heat can be exchanged between the refrigerant and the cooling water. Moreover, the respective passages 36a, 36b, 36c are configured such that when the entire heat exchanger 36 is seen from above, the refrigerant of the Rankine cycle 31 and the cooling water flow in opposite directions.

More specifically, the cooling water passage 36a, which is positioned on an upstream side (a left side in FIG. 1) in terms of the refrigerant of the Rankine cycle 31, is interposed in the first bypass cooling water passage 24. A heat exchanger left side part constituted by the cooling water passage 36a and the part of the refrigerant passage that is adjacent to the cooling water passage 36a serves as a heater that heats the refrigerant of the Rankine cycle 31 flowing through the refrigerant passage 36c by introducing the cooling water exiting the engine 2 directly into the cooling water passage 36a.

Cooling water that has passed through the waste heat recovery device 22 is introduced into the other cooling water passage 36b, which is positioned on a downstream side (a right side in FIG. 1) in terms of the refrigerant of the Rankine cycle 31, through the second bypass cooling water passage 25. A heat exchanger right side part (a downstream side) constituted by the cooling water passage 36b and the part of the refrigerant passage that is adjacent to the cooling water passage 36b serves as a superheater that superheats the refrigerant flowing through the refrigerant passage 36c by introducing cooling water that has been heated by exhaust gas in an engine outlet into the cooling water passage 36b.

A cooling water passage 22a of the waste heat recovery device 22 is provided adjacent to an exhaust pipe 5. By introducing the cooling water from the outlet of the engine 2 into the cooling water passage 22a of the waste heat recovery device 22, the cooling water can be heated to approximately 110 to 115° C., for example, by the high-temperature exhaust gas. The cooling water passage 22a is configured such that when the entire waste heat recovery device 22 is seen from above, the exhaust gas and the cooling water flow in opposite directions.

A control valve 26 is interposed in the second bypass cooling water passage 25 in which the waste heat recovery device 22 is provided. To ensure that the temperature of the cooling water in the interior of the engine 2 does not exceed an allowable temperature (100° C., for example) at which the engine efficiency does not deteriorate and knocking does not occur, for example, an opening degree of the control valve 26 is reduced when a temperature detected by a cooling water temperature sensor 74 provided at the outlet of the engine 2 reaches or exceeds a predetermined value. As a result, the amount of cooling water passing through the waste heat recovery device 22 is reduced when the temperature (an engine water temperature) of the cooling water in the interior of the engine 2 approaches the allowable temperature. Therefore, the engine water temperature can be reliably prevented from exceeding the allowable temperature.

On the other hand, in a case where the flow rate through the second bypass cooling water passage 25 is reduced such that the cooling water temperature is increased excessively by the waste heat recovery device 22 to cause the cooling water to evaporate (or boil), the efficiency of the heat exchanger 36 decreases. Moreover, the cooling water flow through the cooling water passages may deteriorate such that the temperature thereof rises excessively. To avoid this, a bypass exhaust pipe 6 that bypasses the waste heat recovery device 22, and a thermostat valve 7 that controls an amount of exhaust gas passing through the waste heat recovery device 22 and an amount of exhaust gas passing through the bypass exhaust pipe 6, are provided in a bifurcating portion of the exhaust pipe 5. More specifically, a valve opening degree of the thermostat valve 7 is adjusted on the basis of the temperature of the cooling water exiting the waste heat recovery device 22 such that the temperature of the cooling water exiting the waste heat recovery device 22 does not exceed a predetermined temperature (a boiling temperature of 120° C., for example).

The heat exchanger 36, the thermostat valve 7, and the waste heat recovery device 22 are formed integrally as a waste heat recovery unit 23 and disposed midway in the exhaust pipe under a floor substantially centrally in a vehicle width direction (not shown in the drawings). The thermostat valve 7 may be a comparatively simple temperature sensitive valve employing a bimetal or the like, or a control valve controlled by a controller into which an output from a temperature sensor is inputted. When an amount of heat exchange from the exhaust gas to the cooling water is adjusted using the thermostat valve 7, a comparatively large delay occurs. Therefore, it is difficult to ensure that the engine water temperature does not exceed the allowable temperature by adjusting the thermostat valve 7 alone. However, the control valve 26 of the second bypass cooling water passage 25 is controlled on the basis of the engine water temperature (an outlet temperature), and therefore, a heat recovery amount can be reduced quickly so that the engine water temperature is reliably prevented from exceeding the allowable temperature. Moreover, when a degree of leeway remains before the engine water temperature reaches the allowable temperature, the waste heat recovery amount can be increased by performing heat exchange until the temperature of the cooling water exiting the waste heat recovery device 22 reaches a high temperature (110 to 115° C., for example) exceeding the allowable temperature of the engine water temperature. The cooling water exiting the cooling water passage 36b converges with the first bypass cooling water passage 24 via the second bypass cooling water passage 25.

Once the temperature of the cooling water flowing from the bypass cooling water passage 14 toward the thermostat valve 15 has been reduced sufficiently by heat exchange with the refrigerant of the Rankine cycle 31 in the heat exchanger 36, for example, the valve opening degree of the thermostat valve 15 on the cooling water passage 13 side is reduced. As a result, the amount of cooling water passing through the radiator 11 is relatively reduced. Conversely, when the Rankine cycle 31 is inoperative or the like such that the temperature of the cooling water flowing from the bypass cooling water passage 14 toward the thermostat valve 15 increases, the valve opening degree of the thermostat valve 15 on the cooling water passage 13 side is increased. As a result, the amount of cooling water passing through the radiator 11 is relatively increased. By operating the thermostat valve 15 in this manner, the cooling water temperature of the engine 2 is maintained at an appropriate temperature such that an appropriate amount of heat is supplied to (or recovered by) the Rankine cycle 31.

Next, the Rankine cycle 31 will be described. The Rankine cycle 31 is a system for recovering waste heat from the engine 2 in the refrigerant via the cooling water of the engine 2, and regenerating the recovered waste heat as power. The Rankine cycle 31 includes a refrigerant pump 32, the heat exchanger 36 serving as a superheater, an expansion device 37, and a condenser 38. These respective constituent elements are connected by refrigerant passages 41 to 44 through which the refrigerant (R134a or the like) circulates.

A shaft of the refrigerant pump 32 is disposed coaxially with and connected to an output shaft of the expansion device 37 such that the refrigerant pump 32 is driven by an output (or power) generated by the expansion device 37, and power generated thereby is supplied to an output shaft (a crank shaft) of the engine 2 via a belt transmission mechanism. Here, the belt transmission mechanism is constituted by a pump pulley 33, a belt 34, and a crank pulley 2a. More specifically, the shaft of the refrigerant pump 32 and the output shaft of the expansion device 37 are disposed parallel to the output shaft of the engine 2, and the belt 34 is wound between the pump pulley 33, which is provided on a tip end of the shaft of the refrigerant pump 32, and the crank pulley 2a. It should be noted that in the present embodiment, a gear type pump is employed as the refrigerant pump 32 and a scroll type expansion device is employed as the expansion device 37.

Further, an electromagnetic clutch (hereinafter, referred to as an "expansion device clutch") 35 is provided between the pump pulley 33 and the refrigerant pump 32 to be capable of engaging and disengaging the refrigerant pump 32 and the expansion device 37 to and from the engine 2. For this reason, when the output generated by the expansion device 37 exceeds a driving force of the refrigerant pump 32 and friction generated by a rotary body (i.e. when an estimated expansion device torque is positive), the expansion device clutch 35 is engaged. As a result, rotation of the engine output shaft can be assisted by the output generated by the expansion device 37. When the rotation of the engine output shaft is assisted using energy obtained through waste heat recovery in this manner, an improvement in fuel efficiency can be achieved. Moreover, energy required to drive the refrigerant pump 32 in order to circulate the refrigerant can be provided by the recovered waste heat.

The refrigerant from the refrigerant pump 32 is supplied to the heat exchanger 36 through the refrigerant passage 41. The heat exchanger 36 is a heat exchanger that vaporizes the refrigerant so that the refrigerant is superheated by performing heat exchange between the refrigerant and the cooling water of the engine 2.

The refrigerant from the heat exchanger 36 is supplied to the expansion device 37 through the refrigerant passage 42. The expansion device 37 is a steam turbine that converts heat into rotational energy by expanding the vaporized and superheated refrigerant. Power recovered by the expansion device 37 is used to drive the refrigerant pump 32, and is transmitted to the engine 2 via the belt transmission mechanism (33, 34, 2a) in order to assist the rotation of the engine 2.

The refrigerant from the expansion device 37 is supplied to the condenser 38 through the refrigerant passage 43. The condenser 38 is a heat exchanger that cools the refrigerant so that the refrigerant is liquefied by performing heat exchange between the refrigerant and outside air. For this purpose, the condenser 38 is disposed parallel to the radiator 11 so as to be cooled by a radiator fan 12.

The refrigerant liquefied by the condenser 38 is returned to the refrigerant pump 32 through the refrigerant passage 44. Having been returned to the refrigerant pump 32, the refrigerant is sent back to the heat exchanger 36 by the refrigerant pump 32 so as to circulate through the respective constituent elements of the Rankine cycle 31.

Various valves are provided as appropriate on a circuit of the Rankine cycle 31 in order to control the refrigerant flowing through the cycle. For example, an expansion device upstream valve 62 is provided in the refrigerant passage 42 connecting the heat exchanger 36 to the expansion device 37 in order to control the refrigerant circulating through the Rankine cycle 31. Further, an expansion device bypass passage 65 is provided so as to bypass the expansion device 37 from an upstream side of the expansion device upstream valve 62 and converge upstream of a check valve 64, and a bypass valve 66 is provided in the expansion device bypass passage 65. The two valves 62, 66 are both solenoid type open-close valves.

Furthermore, a check valve 63 is provided in the refrigerant passage 41 connecting the refrigerant pump 32 to the heat exchanger 36 to prevent the refrigerant from flowing back to the refrigerant pump 32 from the heat exchanger 36. Moreover, the check valve 64 is provided in the refrigerant passage 43 connecting the expansion device 37 to the condenser 38 to prevent the refrigerant from flowing back to the expansion device 37 from the condenser 38.

Signals from pressure sensors 72, 73 and temperature sensors 81, 82 that detect respective pressures and temperatures at two points in the refrigerant passages 41 to 44 and the bypass passage 65 are input into an engine controller 71. Here, one of the points is the refrigerant passage 42 that extends from an outlet of the heat exchanger 36 to an inlet of the expansion device 37. The pressure sensor 72 detects a pressure (this pressure will be referred to hereafter as a "heat exchanger outlet pressure") Pd in the refrigerant passage 42, and the temperature sensor 81 detects a temperature (this temperature will be referred to hereafter as a "heat exchanger outlet temperature") Td in the refrigerant passage 42. The other point is the refrigerant passage 44 that extends from an outlet of the condenser 38 to an inlet of the refrigerant pump 32. The pressure sensor 73 detects a pressure (this pressure will be referred to hereafter as a "refrigerant pump inlet pressure") Ps in the refrigerant passage 44, and the temperature sensor 82 detects a temperature (this temperature will be referred to hereafter as a "refrigerant pump inlet temperature") Ts in the refrigerant passage 44.

The engine controller 71 controls engagement and disengagement of the expansion device clutch 35 and opening and closing of the two solenoid open-close valves 62, 66 on the basis of these input signals in accordance with predetermined operating conditions.

For example, at the start of an operation of the Rankine cycle 31, a determination is made as to whether the refrigerant is leaking from the refrigerant passages and the bypass passage or not using the refrigerant pump inlet pressure Ps detected by the pressure sensor 73 and the heat exchanger outlet pressure Pd detected by the pressure sensor 72. More specifically, when the refrigerant pump inlet pressure Ps and the heat exchanger outlet pressure Pd are higher than atmospheric pressure, it is determined that the refrigerant is not leaking from the refrigerant passages 41 to 44 and the bypass passage 65. When the refrigerant pump inlet pressure Ps and the heat exchanger outlet pressure Pd are equal to or lower than atmospheric pressure, on the other hand, it is determined that the refrigerant is leaking from the refrigerant passages 41 to 44 and the bypass passage 65. When it is determined that the refrigerant is not leaking from the refrigerant passages 41 to 44 and the bypass passage 65, the operation of the Rankine cycle 31 is started, but when it is determined that the refrigerant is leaking from the refrigerant passages 41 to 44 and the bypass passage 65, the operation of the Rankine cycle 31 is not started.

Further, the expansion device torque (regenerated power) obtained by the operation of the Rankine cycle 31 is estimated to determine whether the expansion device torque is positive or negative. The reason for this is that the expansion device torque is required to manage a target drive torque required by the vehicle. A target engine torque is determined from the target drive torque, but when an accessory load is applied to the engine 2, the torque generated by the engine 2 must be increased correspondingly to obtain the target drive torque. Similarly, if the target drive torque would be greatly surpassed by engaging the expansion device clutch 35 so that the expansion device torque is applied to the engine 2, this torque application is deemed unnecessary. Therefore, it is preferable that the expansion device clutch 35 is disengaged. On the other hand, when the expansion device clutch is engaged in a case where the expansion device torque is negative, the engine torque actually decreases. Therefore, it is preferable that the expansion device clutch 35 is disengaged at this time. Since the expansion device torque is required to manage the target drive torque in this manner, the expansion device torque is estimated in order to determine the approximate value thereof.

For example, the expansion device clutch 35 is engaged when the estimated expansion device torque is positive (when the rotation of the engine output shaft can be assisted), and the expansion device clutch 35 is disengaged when the estimated expansion device torque is zero or negative.

As regards a method of estimating the expansion device torque, the expansion device torque may be estimated simply on the basis of a value obtained by subtracting the refrigerant pump inlet pressure Ps from the heat exchanger outlet pressure Pd. The expansion device torque is estimated to be steadily larger as the pressure difference between Pd and Ps increases. Alternatively, enthalpy h1 in the refrigerant flowing through the refrigerant passage 42 is calculated on the basis of the heat exchanger outlet pressure Pd and the heat exchanger outlet temperature Td, and enthalpy h2 in the refrigerant flowing through the refrigerant passage 44 is calculated on the basis of the refrigerant pump inlet pressure Ps and the refrigerant pump inlet temperature Ts. The expansion device torque is then estimated from a difference h2−h1 between the two enthalpy values. The expansion device torque is estimated to be steadily larger as the difference between h1 and h2 increases.

Here, the enthalpy h1 is a function of the heat exchanger outlet pressure Pd and the heat exchanger outlet temperature Td. Thus, a map of the enthalpy h1 having the heat exchanger outlet pressure Pd and the heat exchanger outlet temperature Td as parameters may be created in advance and stored. Similarly, the enthalpy h2 is a function of the refrigerant pump inlet pressure Ps and the refrigerant pump inlet temperature Ts. Thus, a map of the enthalpy h2 having the refrigerant pump inlet pressure Ps and the refrigerant pump inlet temperature Ts as parameters may be created in advance and stored.

The heat exchanger outlet pressure Pd and the heat exchanger outlet temperature Td are also used to determine whether the pressure of the refrigerant flowing through the Rankine cycle is abnormally high or not, or whether the temperature of the refrigerant flowing through the Rankine cycle is abnormally high or not. More specifically, when the heat exchanger outlet pressure Pd is equal to or lower than an upper limit pressure value, the pressure is determined not to be abnormally high, and when the heat exchanger outlet temperature Td is equal to or lower than an upper limit temperature value, the temperature is determined not to be abnormally high. In this case, the operation of the Rankine cycle 31 is continued. On the other hand, when the heat exchanger outlet pressure Pd exceeds the upper limit pressure value, it is determined that the pressure becomes abnormally high, and when the heat exchanger outlet temperature Td exceeds the upper limit temperature value, it is determined that the temperature becomes abnormally high. In this case, the operation of the Rankine cycle 31 is stopped.

When a cold start is implemented on the engine 2, warmup of the engine 2 is encouraged in order to achieve an improvement in fuel efficiency. For this purpose, before warmup of the engine 2 is complete, the expansion device clutch 35 is set in a disengaged condition to ensure that the refrigerant pump 32 is not driven, and the expansion device upstream valve 62 is closed and the bypass valve 66 is opened to ensure that the expansion device 37 is not driven.

In this case, the expansion device clutch 35 is disengaged by outputting an OFF signal to the expansion device clutch 35 so that a current is not passed through an electromagnetic coil of the expansion device clutch 35.

However, the expansion device clutch 35 may remain stuck in an engaged condition even though an ON signal has not been output to the expansion device clutch 35. A situation in which the expansion device clutch 35 remains stuck in the engaged condition will be referred to hereafter as "clutch ON sticking". When clutch ON sticking occurs in the expansion device clutch 35, the refrigerant pump 32 is driven by the engine 2 such that the refrigerant flows from the condenser 38 to the bypass passage 65 through the refrigerant passages 44, 41, 42, and then flows through the refrigerant passages 43, 44 so as to return to the refrigerant pump 32. In other words, the refrigerant circulates through the cycle so as to capture the heat of the engine cooling water in the heat exchanger 36, and as a result, the completion of warmup of the engine 2 is delayed. Moreover, when the refrigerant pump 32 is driven by the engine 2, the refrigerant pump 32 acts as an unnecessary load on the engine 2, and as a result, the fuel efficiency deteriorates.

For this reason, in a conventional apparatus, this problem is solved by providing a rotation speed sensor for detecting a rotation speed of the expansion device 37 and a current sensor for detecting the current flowing through the electromagnetic coil of the expansion device clutch 35, and diagnosing whether clutch ON sticking has occurred in the expansion device clutch 35 or not on the basis of signals from these sensors. However, since the expansion device rotation speed sensor and the current sensor are expensive, providing these sensors leads to an increase in cost.

Hence, a prerequisite of the first embodiment of the present invention is that the apparatus includes control means (71) that uses the refrigerant pump inlet pressure Ps, the refrigerant pump inlet temperature Ts, the heat exchanger outlet pressure Pd, and the heat exchanger outlet temperature Td when operating the Rankine cycle 31. A diagnosis as to whether clutch ON sticking has occurred in the electromagnetic clutch 35 is then made or not on the basis of the refrigerant pump inlet pressure Ps and the refrigerant pump inlet temperature Ts detected by a couple constituted by the pressure sensor 73 (first pressure detecting means) and the temperature sensor 81 (first temperature detecting means).

When clutch ON sticking has not occurred in the electromagnetic clutch 35, the refrigerant pump 32 is not driven before the start of an operation of the Rankine cycle 31. Therefore, the refrigerant in the interior of the condenser 38 remains in a gas-liquid two-phase condition. However, when clutch ON sticking occurs in the electromagnetic clutch 35 and the refrigerant pump 32 is driven by the engine 2 at the same time as a cold start is implemented on the engine, circulation of the refrigerant is activated. When circulation of the refrigerant is activated, the refrigerant receives a small amount of heat from the engine cooling water in the heat exchanger 36, and a small amount of heat is released from the refrigerant in the condenser 38. As a result, the refrigerant is in a subcooled condition at the inlet to the refrigerant pump 32. In other words, since the refrigerant at the inlet to the refrigerant pump 32 is in a subcooled condition, clutch ON sticking can be diagnosed in the electromagnetic clutch 35. In this case, it is possible to determine whether the refrigerant is in a subcooled condition at the inlet to the refrigerant pump 32 or not from the refrigerant pump inlet pressure Ps and the refrigerant pump inlet temperature Ts detected by the couple constituted by the pressure sensor 73 and the temperature sensor 81.

Similarly, when warmup of the engine is completed while the electromagnetic clutch 35 remains stuck in the ON condition, the refrigerant is in a superheated condition at the outlet of the heat exchanger 36. In other words, since the refrigerant at the outlet of the heat exchanger 36 is in a superheated condition, clutch ON sticking can be diagnosed in the electromagnetic clutch 35. In this case, it is possible to determine whether the refrigerant is in a superheated condition at the outlet of the heat exchanger 36 or not from the heat exchanger outlet pressure Pd and the heat exchanger outlet temperature Td detected by a couple constituted by the pressure sensor 72 and the temperature sensor 82.

As described above, in the first embodiment, it is possible to diagnose whether clutch ON sticking has occurred or not without providing a sensor for detecting the rotation speed of the expansion device 37 and a sensor for detecting the current flowing through the electromagnetic coil of the expansion device clutch 35.

Figure 2:
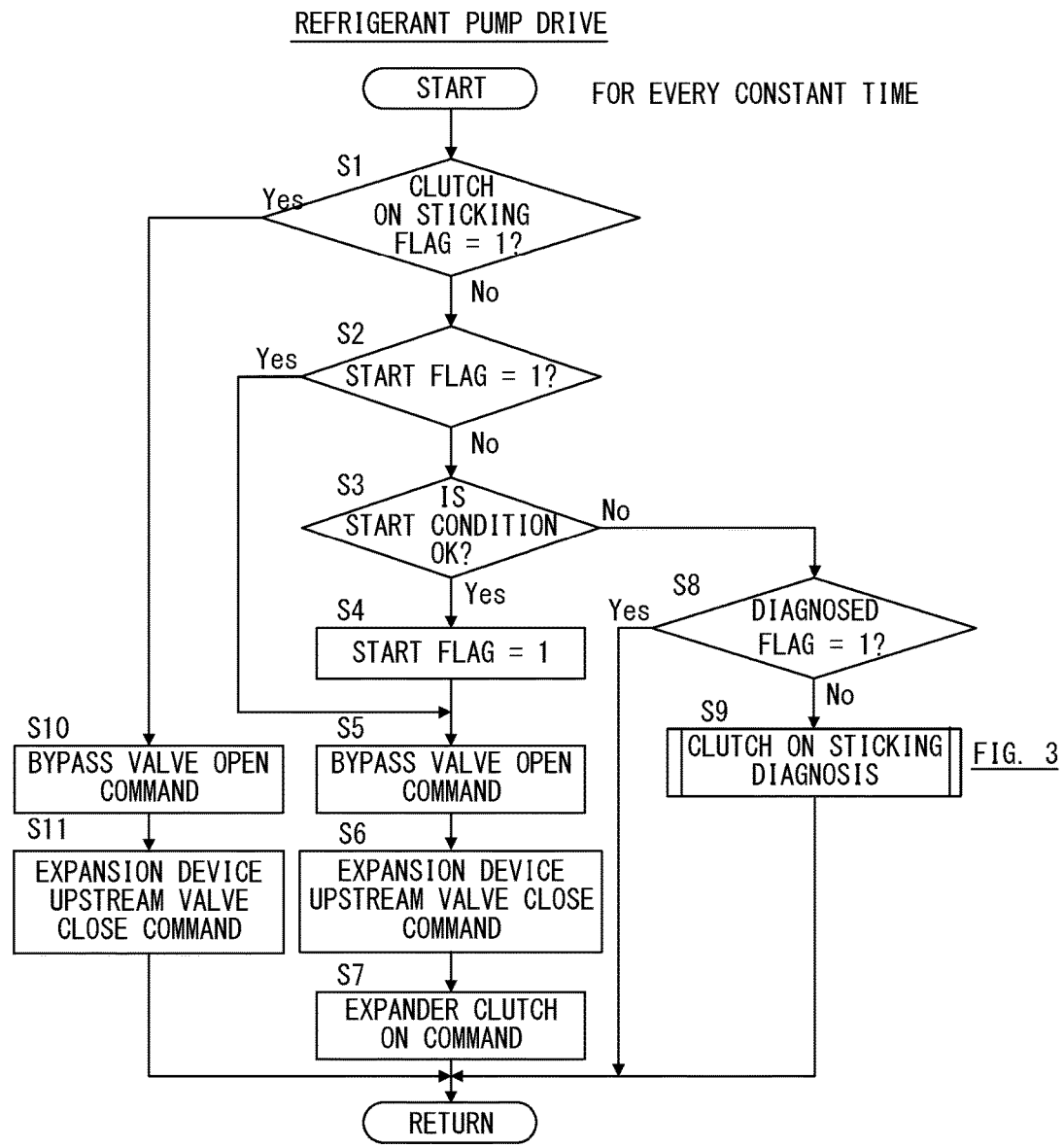
FIG. 2 is a flowchart for explaining driving of a refrigerant pump.
Figure 6:
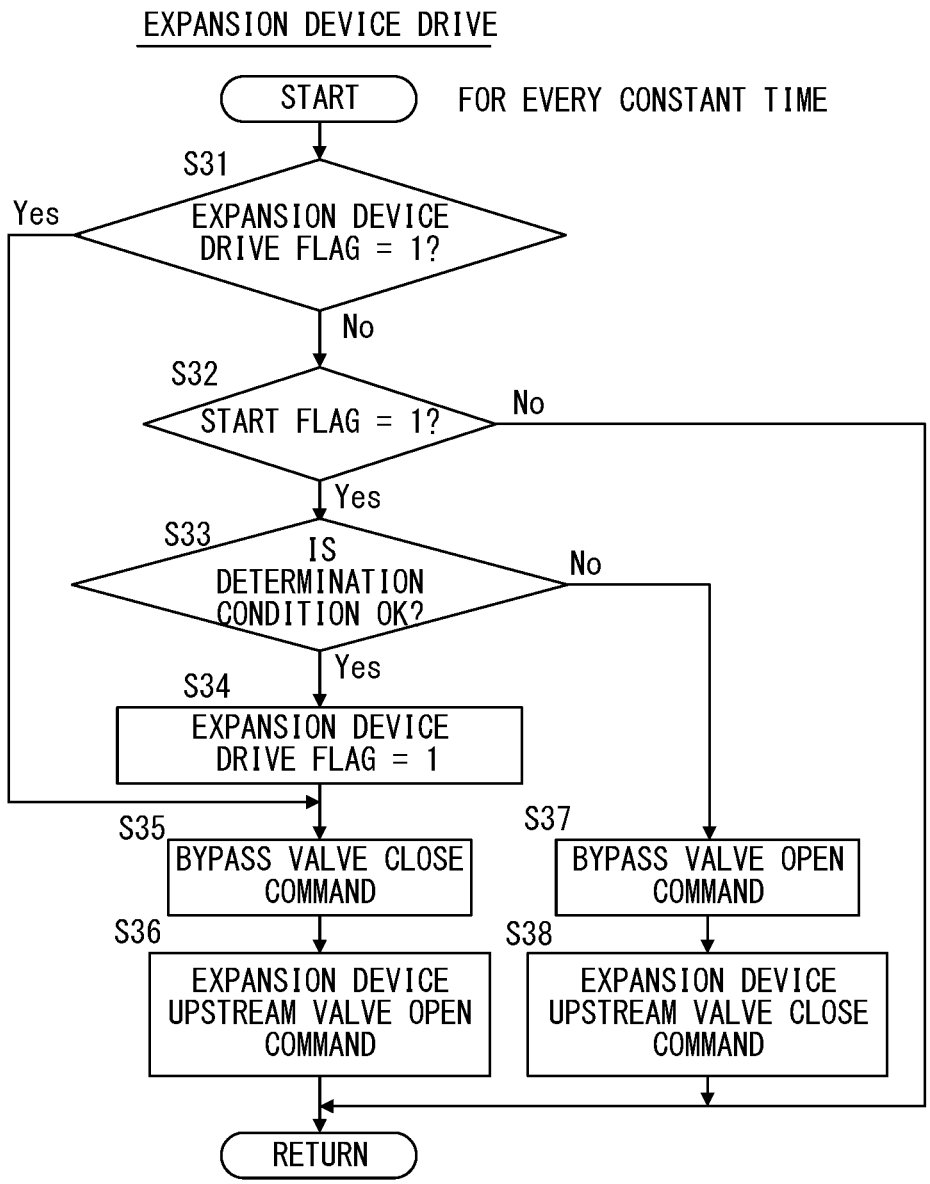
FIG. 6 is a flowchart for explaining driving of an expansion device.

This control executed by the engine controller 71 will be described below with reference to flowcharts. Here, when the Rankine cycle 31 is operated in a case where clutch ON sticking has not occurred in the expansion device clutch 35, processing is executed in two stages. First, in a first stage, the expansion device clutch 35 is engaged, the bypass valve 66 is opened, and the expansion device upstream valve 62 is closed, whereupon the refrigerant pump 32 is rotated idly such that the refrigerant spreads through all of the refrigerant passages 44, 41, 42, the bypass passage 65, and the refrigerant passage 43. In a second stage, the bypass valve 66 is closed and the expansion device upstream valve 62 is opened such that refrigerant is supplied to the expansion device 37, whereupon the expansion device 37 is driven. FIG. 2 shows a flow by which the processing of the first stage is implemented, and FIG. 6 shows a flow by which the processing of the second stage is implemented.

First, the flow shown in FIG. 2 is executed as the first stage at fixed time intervals (every 10 ms, for example) in order to drive the refrigerant pump 32.

At Step 1, a clutch ON sticking flag is checked. It is assumed here that the clutch ON sticking flag=0, and the routine then advances to step 2 and onward.

At Step 2, a start flag (set initially at zero at the time of startup of the engine 2) is checked. It is assumed here that the start flag=0, and the routine then advances to step 3.

At Step 3, a determination is made as to whether condition for activating the Rankine cycle 31 are all OK or not (whether conditions for driving the refrigerant pump are satisfied or not). The conditions for activating the Rankine cycle 31 are satisfied when, for example, no faults have occurred in the pressure sensors 72, 73, no faults have occurred in the temperature sensors 81, 82, the cooling water temperature equals or exceeds a predetermined temperature (in other words, warmup of the engine 2 is complete), and so on. Here, the cooling water temperature is detected by the temperature sensor 74. When all of these start conditions are satisfied, it is determined that the start conditions are all OK, and the routine advances to step 4, where the start flag is set at 1. The routine then advances to step 5 and onward.

At Steps 5, 6, and 7, a command is output to open the bypass valve 66, a command is output to close the expansion device upstream valve 62, and an ON command is output to the expansion device clutch 35. It is assumed here that clutch ON sticking has not occurred in the expansion device clutch 35. When the ON command is output to the expansion device clutch 35, a current is passed through the electromagnetic coil of the expansion device clutch 35, and as a result, the expansion clutch 35 enters the engaged condition. Accordingly, the refrigerant pump 32 is driven by the engine 2 so as to rotate idly.

When the start flag has been set at 1 at Step 4, the routine skips steps 3 and 4 during subsequent executions of the processing so as to advance from steps 1 and 2 to steps 5 to 7, whereupon the operations of steps 5 to 7 are executed repeatedly. As a result, the refrigerant circulates through the refrigerant passages 44, 41, 42, the bypass passage 65, and the refrigerant passages 43, 44.

In this case, liquid refrigerant must be supplied to the refrigerant pump 32. The reason for this is that the refrigerant pump 32 is a mechanical pump, and therefore, when refrigerant intermixed with gas is supplied thereto, the pump simply rotates idly. Accordingly, the expansion device 37 cannot be operated before liquid refrigerant is supplied to the refrigerant pump 32, and therefore the refrigerant is caused to flow so as to bypass the expansion device 37, in so doing causing the refrigerant pump 32 to rotate idly.

When the start conditions are not all OK at Step 3 (when the conditions for driving the refrigerant pump are not satisfied), the routine advances to step 8, where a diagnosis completion flag is checked. It is assumed here that the diagnosis completion flag=0, and the routine then advances to step 9, where a clutch ON sticking diagnosis is performed. Processing executed at Step 9 will be described below using the flow shown in FIG. 3.

Figure 3:
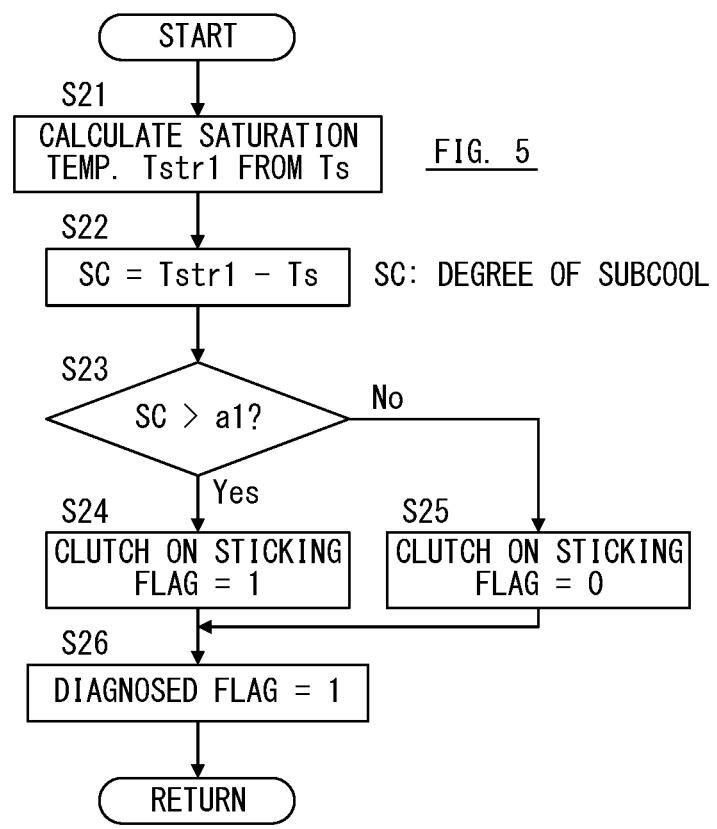
FIG. 3 is a flowchart for explaining diagnosis of clutch engaged sticking.

The flow shown in FIG. 3 (a sub-routine of step 9 in FIG. 2) is executed in order to diagnose clutch ON sticking.

Figure 5:
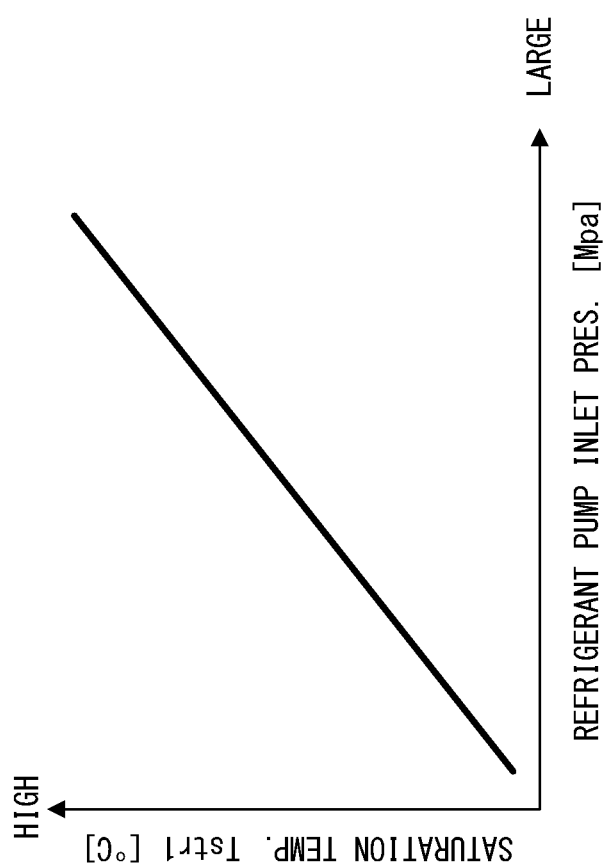
FIG. 5 is a characteristic diagram showing a saturation temperature relative to a refrigerant pump inlet pressure.

At Step 21, a saturation temperature (a temperature on a saturated liquid line) Tstr1 [° C.] is calculated by checking a table having content shown in FIG. 5 in accordance with the refrigerant pump inlet pressure Ps [MPa]detected by the pressure sensor 73. At Step 22, a value obtained by subtracting the refrigerant pump inlet temperature Ts [° C.] detected by the temperature sensor 81 from the saturation temperature Tstr1 is calculated as a degree of subcool SC [° C.] of the refrigerant.

Figure 4:
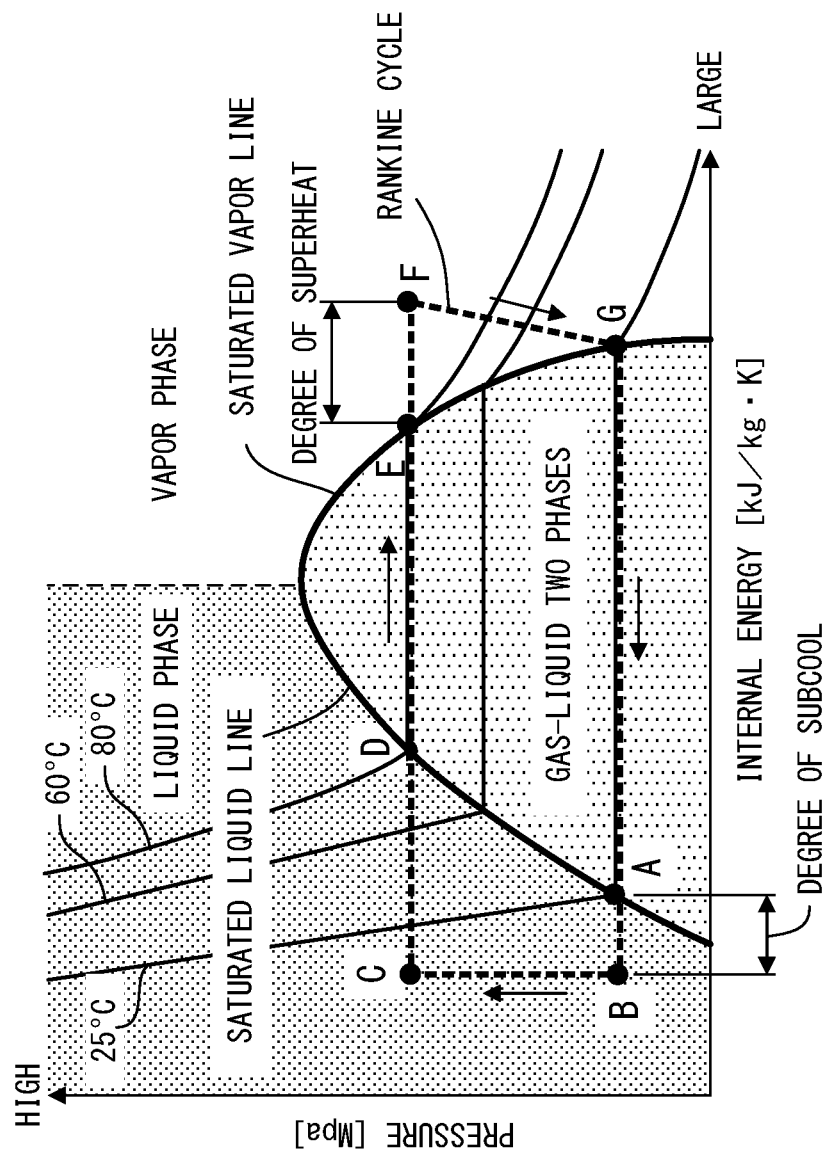
FIG. 4 is a diagram showing phase conditions of a refrigerant.

Here, the degree of subcool of the refrigerant will be described briefly with reference to FIG. 4. FIG. 4 is a diagram showing phase conditions of the refrigerant, on which an internal energy [kJ/kg×K] of the refrigerant is plotted on the abscissa and the pressure [MPa] of the refrigerant is plotted on the ordinate. The inner side of an upwardly curving line drawn in the center of the diagram denotes the gas-liquid two-phase condition, and when a vertical line passing through the highest point of the curve is imagined, a left side of the vertical line on the outside of the curve denotes the liquid phase and a right side of the vertical line on the outside of the curve denotes the gas phase. The refrigerant transitions through these three phases, namely the gas-liquid two-phase condition, the liquid phase, and the vapor phase. Saturation curves are used to determine boundaries between the three phases, and the saturation curves are constituted by a saturated liquid line, which is a line at which the refrigerant shifts from the liquid phase to the gas-liquid two-phase condition, and a saturated vapor line, which is a line at which the refrigerant shifts from the gas-liquid two-phase condition to the gas phase.

When constant refrigerant temperature lines are overlaid on the phase condition diagram, the diagram shown in FIG. 4 is obtained. In actuality, the number of constant temperature lines is infinite, but here, representative constant temperature lines are shown at refrigerant temperatures of 25° C., 60° C., and 80° C. For example, when the refrigerant in the liquid phase is at 80° C., the pressure of the refrigerant shifts in a decreasing direction as the internal energy thereof increases until the pressure reaches a point D on the saturated liquid line. At the point D, the refrigerant transitions to the gas-liquid two-phase condition. In the gas-liquid two-phase condition, the pressure does not vary. For this reason, when the internal energy of the refrigerant is increased by heating the refrigerant, the internal energy shifts rightward in a horizontal direction until reaching a point E on the saturated vapor line. At the point E, the refrigerant transitions to the vapor phase.

When these refrigerant phase conditions are applied to the refrigerant in the Rankine cycle, a connected cycle of A-B-C-D-E-F-G-A (see dotted lines in FIG. 4), for example, is used as the Rankine cycle. More specifically, when the refrigerant is at 25° C., i.e. equal to outside air temperature, before the start of an operation of the Rankine cycle 31, the refrigerant is in the gas-liquid two-phase condition (at any point between the point A and a point G). When the refrigerant pump 32 is driven in this condition, the condenser 38 is activated gradually. Thus, the refrigerant advances leftward in the horizontal direction from the point A on the saturated liquid line while maintaining a constant pressure until reaching a point B in the liquid phase. The point B is a point at which the refrigerant in the liquid phase is subcooled. When the liquid refrigerant in the subcooled condition is pressurized by the refrigerant pump 32, the condition of the refrigerant shifts from the point B toward a point C such that the pressure of the refrigerant increases by a fixed amount from the point B. When heat is applied by the heat exchanger 36 to the refrigerant in the liquid phase at the point C while the pressure of the refrigerant remains constant, the refrigerant shifts from the liquid phase to the gas-liquid two-phase condition at the point D on the saturated liquid line, then shifts from the gas-liquid two-phase condition to the vapor phase at the point E on the saturated vapor line, and then shifts to a point F in the vapor phase. The point F is a point at which the refrigerant in the vapor phase is superheated. When the refrigerant in the vapor phase at the point F is supplied to the expansion device 37 and the energy of the refrigerant is regenerated as power, the pressure and the internal energy of the refrigerant both decrease. Thus, the condition of the refrigerant shifts from the point F toward the point G. When the refrigerant exiting the expansion device 37 is led to the condenser 38 and cooled thereby, the refrigerant shifts to the gas-liquid two-phase condition at the point G. When the refrigerant is cooled by the condenser 38 further, the refrigerant reaches the point A on the saturated liquid line, and then advances further leftward in the horizontal direction while maintaining a constant pressure until reaching the point B of the liquid phase. The cycle described above is then repeated. It should be noted that in actuality, the dotted lines indicating the Rankine cycle and the constant temperature lines overlap, but when the lines overlap, they become more difficult to see. Thus, the dotted lines indicating the Rankine cycle are shown at a slight remove from the constant temperature lines.

On the refrigerant phase condition diagram, liquid refrigerant cooled to or below the saturation temperature in a condition of constant pressure is referred to as subcooled refrigerant, and a difference between the saturation temperature and the temperature of the subcooled refrigerant is referred to as the degree of subcool SC [° C.]. On the Rankine cycle indicated by dotted lines in FIG. 4, a value obtained by subtracting the temperature of the subcooled refrigerant at the point B from the saturation temperature at the point A is the degree of subcool SC. The saturation temperature at the point A (in other words, the temperature on the saturated liquid line) is determined univocally in accordance with the pressure of the refrigerant, and therefore, as shown in FIG. 5, a characteristic of the saturation temperature (the temperature on the saturated liquid line) Tstr1 relative to the refrigerant pump inlet pressure Ps is to be determined in advance by adaptation. The temperature of the subcooled refrigerant at the point B, or in other words the refrigerant pump inlet temperature Ts, can be detected by the temperature sensor 81.

Returning to the flow of FIG. 3, at Step 23, the calculated degree of subcool SC [° C.] is compared with a predetermined value a1 [° C.]. The predetermined value a1 is set in advance at a value (approximately 3° C. to 5° C., for example) for determining whether clutch ON sticking has occurred in the expansion device clutch 35 or not. When the degree of subcool SC exceeds the predetermined value a1, it is determined that clutch ON sticking has occurred in the expansion device clutch 35, and the clutch ON sticking flag is set at 1 at Step 24.

The reason why a degree of subcool SC exceeding the predetermined value a1 occurs when clutch ON sticking occurs in the expansion device clutch 35 is as follows. Before starting to drive the refrigerant pump 32, the refrigerant is in the gas-liquid two-phase condition. When the engine 2 is started while cold in a condition where clutch ON sticking has occurred in the expansion device clutch 35, the refrigerant pump 32 is driven by the engine 2 such that a small amount of refrigerant circulates through the refrigerant passages 44, 41, 42, the bypass passage 65, and the refrigerant passages 43, 44. As a result of this refrigerant circulation, the refrigerant receives a small amount of heat from the cooling water of the engine 2 in the heat exchanger 36, and a small amount of heat is released from the refrigerant in the condenser 38. Accordingly, the condition of the refrigerant shifts from the point A to the point B in FIG. 4 such that at the refrigerant pump inlet, the refrigerant is subcooled. In other words, when clutch ON sticking occurs in the expansion device clutch 35, a degree of subcool SC exceeding the predetermined value a1 is generated.

When the degree of subcool SC is equal to or smaller than the predetermined value a1 at Step 23, on the other hand, it is determined that clutch ON sticking has not occurred in the expansion device clutch 35, and the routine advances to step 25, where the clutch ON sticking flag is set at 0.

At this point, the diagnosis as to whether clutch ON sticking has occurred in the expansion device clutch 35 or not is complete. Thus, a diagnosis completion flag (set initially at zero at the time of engine startup) is set at 1 at Step 26.

At this point, all of the processing of the subroutine is complete. Thus, the routine returns to the flow of FIG. 2. During subsequent executions of the processing, the routine advances from step 1 to steps 10 and 11 when the clutch ON sticking flag=1 in the flow of FIG. 3. At Steps 10 and 11, a command to open the bypass valve 66 and a command to close the expansion device upstream valve 62 are output to ensure that the expansion device 37 is not driven.

When the clutch ON sticking flag=0 (and the diagnosis completion flag =1) in the flow of FIG. 3, on the other hand, the routine advances from step 1 to step 2 onward during subsequent executions of the processing.

The flow shown in FIG. 6 is executed as the second stage at fixed time intervals (every 10 ms, for example) following the flow of FIG. 2 in order to drive the expansion device 37.

At Step 31, an expansion device drive flag (set initially at zero at the time of engine startup) is checked. It is assumed here that the expansion device drive flag=0, and the routine then advances to step 32.

At Step 32, the start flag (set during the flow of FIG. 2) is checked. When the start flag=0, the current processing is terminated as is.

When the start flag=1, the routine advances to step 33, where a determination is made as to whether a condition for determining that the refrigerant may be supplied to the expansion device 37 is satisfied or not. It is assumed here for simplicity that the condition for determining that the refrigerant may be supplied to the expansion device 37 is satisfied when the refrigerant is in the subcooled condition at the refrigerant pump inlet, or in other words when the degree of subcool of the refrigerant exceeds the predetermined value a1. The condenser 38 is known to be in the gas-liquid two-phase condition before starting to drive the refrigerant pump 32, but the engine controller 71 does not know whether the refrigerant is in a liquid condition or a gas condition at the inlet to the refrigerant pump 32 before starting to drive the refrigerant pump 32. However, when the refrigerant pump 32 is driven such that the refrigerant circulates through the refrigerant passages 44, 41, 42, the bypass passage 65, and the refrigerant passages 43, 44, the refrigerant eventually enters the subcooled condition at the refrigerant pump inlet. A determination as to whether the refrigerant is in the subcooled condition at the refrigerant pump inlet or not can be made by calculating the degree of subcool SC on the basis of the pressure and the temperature at the refrigerant pump inlet and comparing the calculated degree of subcool SC with the predetermined value a1, as described above. When the degree of subcool SC calculated at Step 33 is equal to or smaller than the predetermined value a1, the condition for determining that the refrigerant may be supplied to the expansion device 37 is determined not to be satisfied, and the routine then advances to steps 37 and 38, where an open command is output to the bypass valve 66 and a close command is output to the expansion device upstream valve 62.

On the other hand, when the degree of subcool SC calculated at Step 33 exceeds the predetermined value a1, it is determined that the condition for determining that the refrigerant may be supplied to the expansion device 37 is satisfied, and the routine then advances to step 34, where the expansion device drive flag is set at 1. The routine then advances to steps 35 and 36. At Step 35, a close command is output to the bypass valve 66 and an open command is output to the expansion device upstream valve 62. Accordingly, gas refrigerant is supplied to the expansion device 37, and as a result, the expansion device 37 is driven.

When the expansion device drive flag is set at 1 at Step 34, the routine skips steps 32, 33, and 34 during subsequent executions of the processing so as to advance from step 31 to steps 35 and 36, whereupon the operations of steps 35 and 36 are executed repeatedly.

Actions and effects of the present embodiment will now be described.

The present embodiment includes the Rankine cycle 31, and the transmission mechanism (33, 34, 2a) in which the refrigerant pump 32 and the expansion device 37 are provided on an identical shaft and the shaft is connected to the rotary shaft of the engine 2 via the expansion device clutch 35 (an electromagnetic clutch) that can be engaged and disengaged. Further, the present embodiment includes the pressure sensor 73 (the first pressure detecting means), the temperature sensor 81 (the first temperature detecting means), the pressure sensor 72 (second pressure detecting means), and the temperature sensor 82 (second temperature detecting means). Furthermore, the present embodiment includes the control means (71) that uses the detection values detected by these four sensors when operating the Rankine cycle. The above configurations serve as prerequisites of the present embodiment. Moreover, the present embodiment includes sticking diagnosis means for diagnosing whether clutch ON sticking has occurred in the expansion device clutch 35 or not (i.e. whether the electromagnetic clutch is stuck in the engaged condition or not) on the basis of the pressure and the temperature detected by the couple constituted by the pressure sensor 73 and the temperature sensor 81. Hence, according to the present embodiment, sticking of the expansion device clutch 35 (the electromagnetic clutch) can be diagnosed using the existing pressure sensor 73 and temperature sensor 81 without providing an expansion device rotation speed sensor and a current sensor, and as a result, a cost increase can be suppressed.

In the present embodiment, the degree of subcool SC of the refrigerant is calculated on the basis of the pressure and temperature detected by the couple constituted by the pressure sensor 73 and the temperature sensor 81 (see steps 21 and 22 in FIG. 3). When the calculated degree of subcool SC exceeds the predetermined value a1 that is defined in advance, clutch ON sticking is diagnosed in the expansion device clutch 35 (the electromagnetic clutch is diagnosed as being stuck in the engaged condition) (see steps 23 and 24 in FIG. 3). As a result, clutch ON sticking can be diagnosed in the expansion device clutch 35 easily.

In the present embodiment, the pressure sensor 73 detects the refrigerant pump 32 inlet pressure Ps, and the temperature sensor 81 detects the refrigerant pump 32 inlet temperature Ts. The inlet of the refrigerant pump 32 is the site within the refrigerant passages and the bypass passage constituting the Rankine cycle 31 where the pressure and the temperature fall furthest below atmospheric conditions, and therefore the pressure difference and temperature difference relative to atmospheric conditions reach maximum values. According to the present embodiment, which is based on the pressure and the temperature that are furthest below atmospheric conditions, the sticking diagnosis can be performed with a high degree of precision.

One of the start conditions is that warmup of the engine 2 is complete. In the present embodiment, the sticking diagnosis is performed when the start conditions (the conditions for driving the refrigerant pump 32) are not satisfied (see steps 2, 3, 8, and 9 in FIG. 2), and therefore the sticking diagnosis is completed before warmup of the engine 2 is complete. Therefore, in a case where it is determined that clutch ON sticking has occurred in the expansion device clutch 35, an operation of the Rankine cycle 31 need not be started needlessly after warmup of the engine 2 is complete.

(Second Embodiment)

Figure 7:
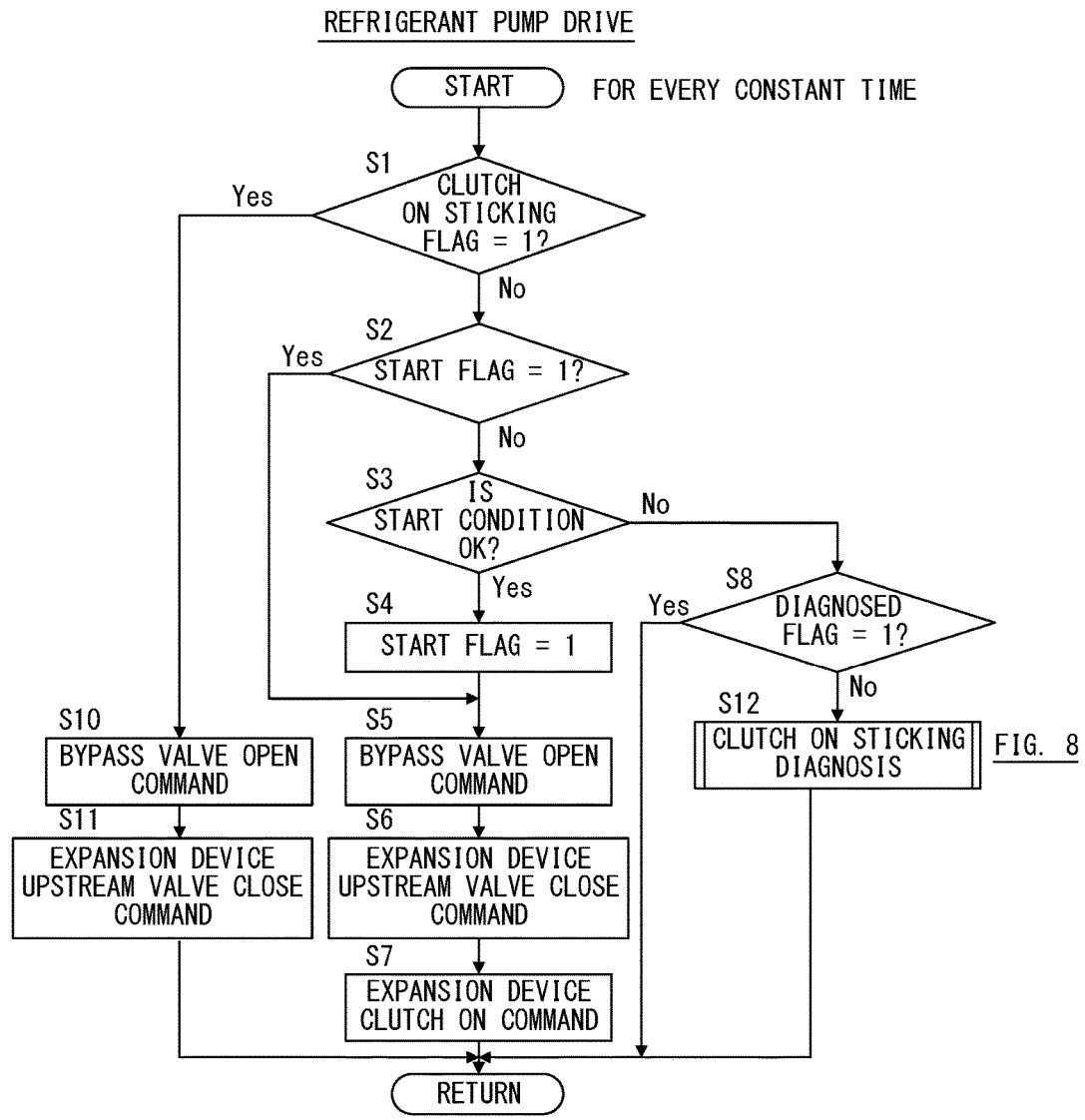
FIG. 7 is a flowchart for explaining driving of a refrigerant pump according to a second embodiment.

A flow shown in FIG. 7 is executed at fixed time intervals (every 10 ms, for example) in order to drive the refrigerant pump 32 according to a second embodiment. Parts that are identical to the flow of FIG. 2 in the first embodiment have been allocated identical reference symbols.

In the first embodiment, the determination as to whether clutch ON sticking has occurred in the expansion device clutch 35 or not is made on the basis of the degree of subcool of the refrigerant. In the second embodiment, on the other hand, the determination as to whether clutch ON sticking has occurred in the expansion device clutch 35 or not is made on the basis of a degree of superheat of the refrigerant.

The following description focuses mainly on differences with the first embodiment. When a diagnosis completion flag=0 at Step 8 of the flow shown in FIG. 7, the routine advances to step 12, where a clutch ON sticking diagnosis is performed. The processing of step 12 will now be described using a flow shown in FIG. 8.

Figure 8:
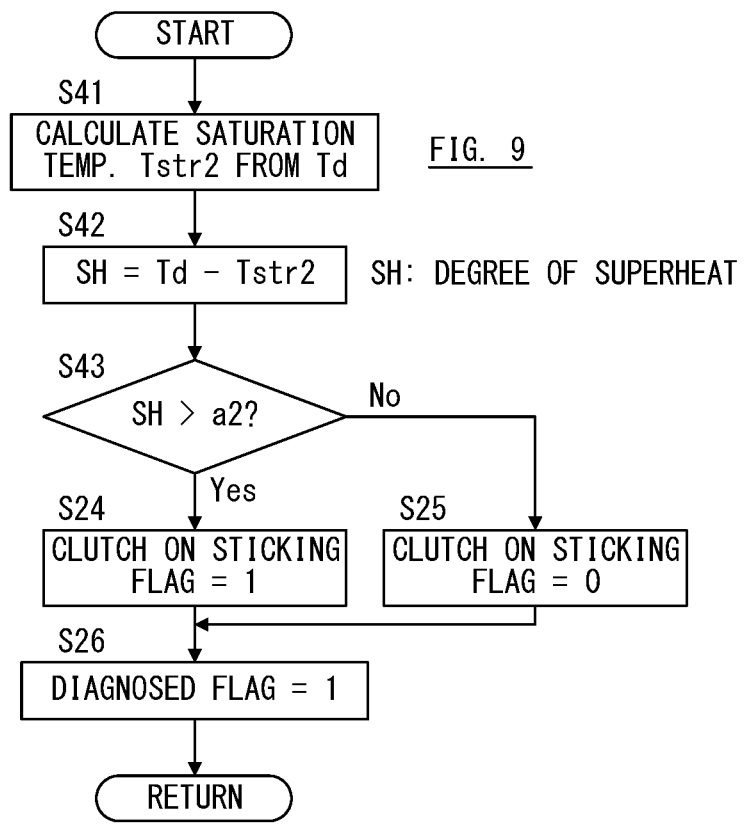
FIG. 8 is a flowchart for explaining diagnosis of clutch engaged sticking according to the second embodiment.

The flow shown in FIG. 8 (a subroutine of step 12 in FIG. 7) is used to perform the clutch ON sticking diagnosis. Parts that are identical to the flow of FIG. 3 in the first embodiment have been allocated identical reference symbols. The flow of FIG. 6 in the first embodiment is employed as is likewise in the second embodiment.

Figure 9:
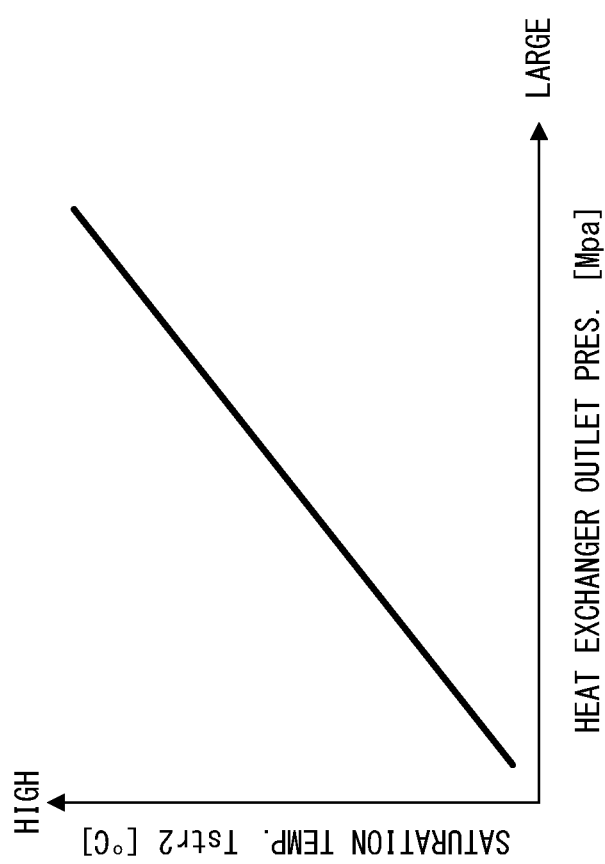
FIG. 9 is a characteristic diagram showing a saturation temperature relative to a heat exchanger outlet pressure according to the second embodiment.

At Step 41, a saturation temperature (a temperature on the saturated vapor line) Tstr2 [° C.] is calculated by checking a table having content shown in FIG. 9 in accordance with the heat exchanger outlet pressure Pd [MPa] detected by the pressure sensor 72 (the second pressure detecting means). At Step 42, a value obtained by subtracting this temperature Tstr2 from the heat exchanger outlet temperature Td [° C.] detected by the temperature sensor 82 (the second temperature detecting means) is calculated as the degree of superheat SH [° C.] of the refrigerant.

The degree of superheat SH will now be described briefly with reference to FIG. 4. On the refrigerant phase condition diagram, vapor refrigerant heated to or above the saturation temperature in a condition of constant pressure is referred to as superheated vapor refrigerant, and a difference between the temperature of the superheated vapor refrigerant and the saturation temperature is referred to as the degree of superheat [° C.]. On the Rankine cycle indicated by dotted lines in FIG. 4, a value obtained by subtracting the saturation temperature at the point E from the temperature of the superheated vapor refrigerant at the point F is the degree of superheat SH. The saturation temperature at the point E (in other words, the temperature on the saturated vapor line) is determined univocally in accordance with the pressure of the refrigerant, and therefore, as shown in FIG. 9, the characteristic of the saturation temperature (the temperature on the saturated liquid line) Tstr2 relative to the heat exchanger outlet pressure Pd is to be determined in advance by adaptation. The temperature of the superheated vapor refrigerant at the point F, or in other words the heat exchanger outlet temperature Td, can be detected by the temperature sensor 82.

Returning to the flow of FIG. 8, at Step 43, the calculated degree of superheat SH is compared with a predetermined value a2 [° C.]. The predetermined value a2 is set in advance at a value (approximately 5° C. to 10° C., for example) for diagnosing whether clutch ON sticking has occurred in the expansion device clutch 35 or not. When the degree of superheat SH exceeds the predetermined value a2, it is determined that clutch ON sticking has occurred in the expansion device clutch 35, and the clutch ON sticking flag is set at 1 at Step 24.

The reason why a degree of superheat SH exceeding the predetermined value a2 is generated when clutch ON sticking occurs in the expansion device clutch 35 is as follows. Before starting to drive the refrigerant pump 32, the refrigerant is in the gas-liquid two-phase condition. When the engine 2 is started while cold in a condition where clutch ON sticking has occurred in the expansion device clutch 35, the refrigerant pump 32 is driven by the engine 2 such that a small amount of refrigerant circulates through the refrigerant passages 44, 41, 42, the bypass passage 65, and the refrigerant passages 43, 44. As a result of this refrigerant circulation, the refrigerant receives a small amount of heat from the cooling water of the engine 2 in the heat exchanger 36, and a small amount of heat is released from the refrigerant in the condenser 38. Accordingly, the condition of the refrigerant shifts from the point A to the point B in FIG. 4 such that at the refrigerant pump inlet, the refrigerant is subcooled. Hence, when the refrigerant pump 32 is driven such that the liquid refrigerant is supplied to the heat exchanger 36, the condition of the refrigerant shifts from the point B to the point C in FIG. 4. Once warmup of the engine 2 is complete, the refrigerant receives heat continuously from the cooling water of the engine 2, and therefore the condition of the refrigerant shifts from the point C to the point F via the point D and the point E in FIG. 4 so that at the heat exchanger outlet, the refrigerant takes the form of superheated vapor. In other words, a degree of superheat SH exceeding the predetermined value a2 is generated shortly after the completion of engine warmup.

When the degree of superheat SH is equal to or smaller than the predetermined value a2 at Step 43, on the other hand, it is determined that clutch ON sticking has not occurred in the expansion device clutch 35, and the routine advances to step 25, where the clutch ON sticking flag is set at 0.

At this point, the diagnosis as to whether clutch ON sticking has occurred in the expansion device clutch 35 or not is complete. Thus, the diagnosis completion flag (set initially at zero at the time of engine startup) is set at 1 at Step 26.

At this point, all of the processing of the subroutine is complete. Thus, the routine returns to the flow of FIG. 7. During subsequent executions of the processing, the routine advances from step 1 to steps 10 and 11 when the clutch ON sticking flag=1 in the flow of FIG. 8. At Steps 10 and 11, a command to open the bypass valve 66 and a command to close the expansion device upstream valve 62 are output to ensure that the expansion device 37 is not driven.

On the other hand, when the clutch ON sticking flag=0 (and the diagnosis completion flag=1) in the flow of FIG. 8, the routine advances from step 1 to step 2 onward during subsequent executions of the processing.

As described above, according to the second embodiment, the degree of superheat SH of the refrigerant is calculated on the basis of the pressure and temperature detected by the couple constituted by the pressure sensor 72 and the temperature sensor 82 (see steps 41 and 42 in FIG. 8). When the calculated degree of superheat SH exceeds the predetermined value a2 that is defined in advance, clutch ON sticking is diagnosed in the expansion device clutch 35 (the electromagnetic clutch is diagnosed as being stuck in the engaged condition) (see steps 43 and 24 in FIG. 8). As a result, clutch ON sticking can be diagnosed in the expansion device clutch 35 easily.

In the second embodiment, the pressure sensor 72 detects the heat exchanger 36 outlet pressure, and the temperature sensor 82 detects the heat exchanger 36 outlet temperature. The outlet of the heat exchanger 36 is the site within the refrigerant passages and the bypass passage constituting the Rankine cycle 31 where the pressure and the temperature rise furthest above atmospheric conditions, and therefore the pressure difference and temperature difference relative to atmospheric conditions reach maximum values. According to the second embodiment, which is based on the pressure and the temperature that are furthest above atmospheric conditions, the sticking diagnosis can be performed with a high degree of precision.

(Third Embodiment)

Figure 10:
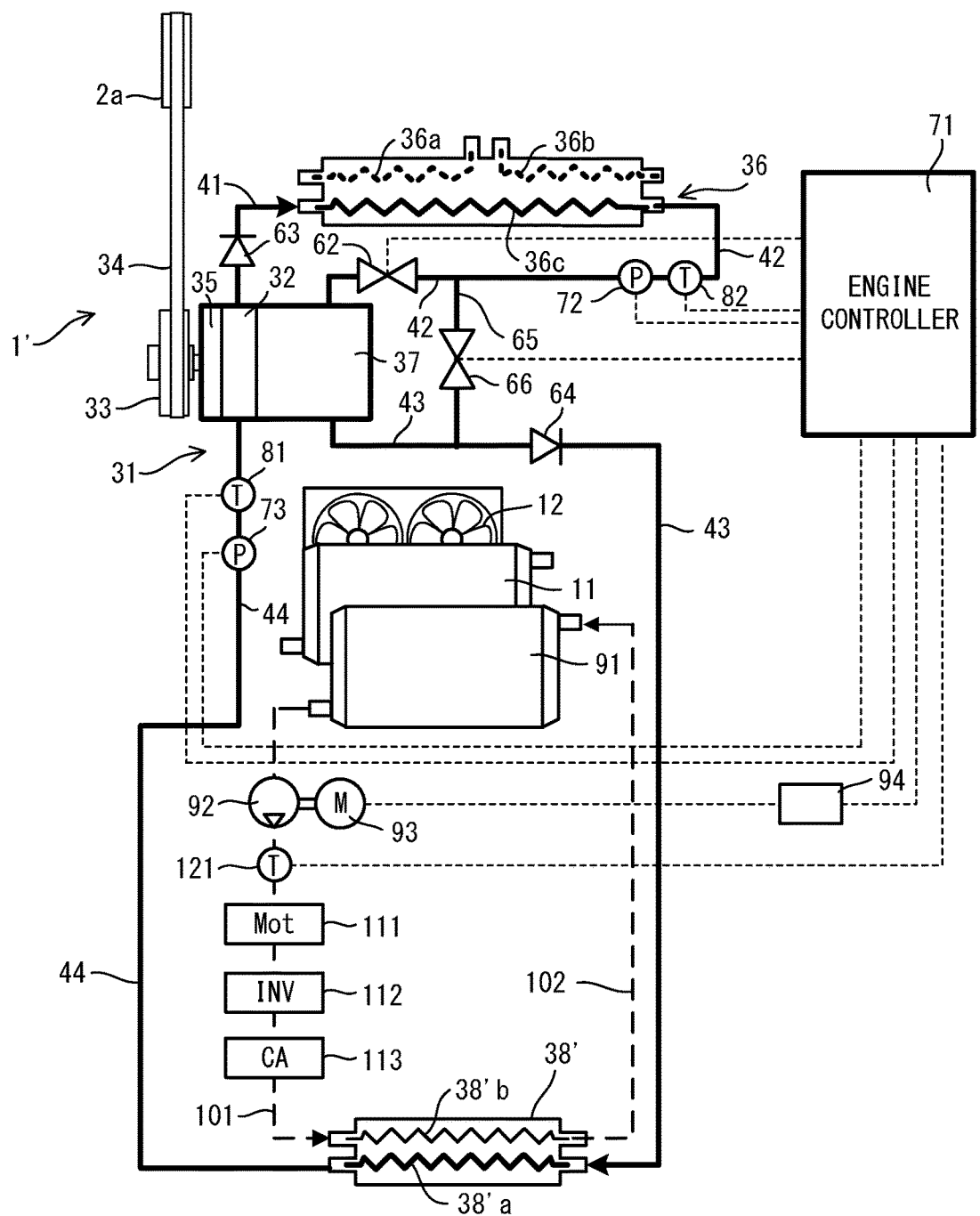
FIG. 10 is a schematic configuration view showing an overall system of a Rankine cycle according to a third embodiment.

FIG. 10 is a schematic configuration view showing an overall system of a Rankine cycle according to a third embodiment. Parts that are identical to the first embodiment, shown in FIG. 1, have been allocated identical reference numerals. It should be noted, however, that the engine cooling water circuit is not shown in the drawings.

The first and second embodiments were applied to the engine-driven vehicle 1, whereas the third embodiment is applied to a hybrid vehicle 1'. As is well known, a strong electric system constituted mainly by a strong electric battery, an inverter that converts a direct current from the strong electric battery into an alternating current, and a motor that can be rotated by the alternating current from the inverter is applied to the hybrid vehicle 1'. In this case, the motor and the inverter forming the strong electric system may both reach high temperatures, and therefore respective interiors of the motor and the inverter must be cooled so as not to exceed temperatures at which the functions of the motor and the inverter can be ensured.

For this purpose, when the Rankine cycle 31 is applied to the hybrid vehicle 1', the condenser configuration is modified from that of the engine-driven vehicle 1. More specifically, in the first and second embodiments, the condenser 38 is cooled by air, whereas in the third embodiment, a water-cooled condenser 38' is employed.

The water-cooled condenser 38' is provided with a refrigerant passage 38'a and a cooling water passage 38'b. One end of the refrigerant passage 38'a is connected to the refrigerant passage 43 of the Rankine cycle 31, and another end is connected to the refrigerant passage 44 of the Rankine cycle 31.

On the other hand, cooling water (this cooling water will be referred to hereafter as "second cooling water" to differentiate the second cooling water from the engine cooling water) cooled by a sub-radiator 91 is circulated through the cooling water passage 38'b via cooling water passages 101, 102. For this purpose, one end of each of the cooling water passages 101, 102 is connected to the cooling water passage 38'b, and another end of each of the cooling water passages 101 102 is connected to the sub-radiator 91. Here, when the entire water-cooled condenser 38' is seen from above, the second cooling water and the refrigerant of the Rankine cycle 31 flow in opposite directions.

The sub-radiator 91 is disposed parallel to the radiator 11 so as to be cooled by vehicle speed wind or the cooling fan 12. A cooling water pump 92 is provided at an outlet of the sub-radiator 91 in order to circulate the second cooling water.

The cooling water pump 92 includes a current value adjustment device 94 that is driven by a motor 93 so as to be capable of adjusting a value of a current flowing through the motor 93. The value of the current flowing through the motor 93 can be duty-controlled (adjusted) by the current value adjustment device 94. A battery is used as a power supply of the current value adjustment device 94. For example, when an ON duty value applied to the current value adjustment device 94 is 0%, the motor 93 remains in a non-driven condition and the cooling water pump 92 does not rotate. When the ON duty value applied to the current value adjustment device 94 is at a maximum of 100%, the motor 93 enters a driven condition and the cooling water pump 92 rotates so as to discharge the cooling water at a maximum flow rate.

A cooling water passage 111 for the motor, a cooling water passage 112 for the inverter, and a water-cooled intercooler 113 are disposed in series in the cooling water passage 101 downstream of the cooling water pump 92 in order to cool the motor and the inverter forming the strong electric system. As a result, the motor and the inverter are cooled by cooling water from the sub-radiator 91 so as not to exceed temperatures at which the functions of the motor and the inverter can be ensured. A temperature sensor 121 for detecting the temperature of the second cooling water is also provided in the cooling water passage 101 downstream of the cooling water pump 92.

In the third embodiment, only the vehicle is different, and the flows of the first embodiment, shown in FIGS. 2, 3, and 6, can be employed as is in the third embodiment. Moreover, the flows of the second embodiment, shown in FIGS. 7, 8, and 6, can likewise be employed as is in the third embodiment.

As described above, according to the third embodiment, likewise with the hybrid vehicle 1', a sticking diagnosis can be performed on the expansion device clutch 35 (the electromagnetic clutch) using the existing pressure sensor 73 and temperature sensor 81 without providing an expansion device rotation speed sensor and a current sensor, and as a result, a cost increase can be suppressed. Moreover, likewise with the hybrid vehicle, a sticking diagnosis can be performed on the expansion device clutch 35 (the electromagnetic clutch) using the existing pressure sensor 72 and temperature sensor 82 without providing an expansion device rotation speed sensor and a current sensor, and as a result, a cost increase can be suppressed.

Cases in which the expansion device upstream valve 62 is provided were described in the embodiments, but the expansion device upstream valve 62 may be omitted.

Cases in which the first pressure detecting means detects the inlet pressure of the refrigerant pump, the first temperature detecting means detects the inlet temperature of the refrigerant pump, the second pressure detecting means detects the outlet pressure of the heat exchanger, and the second temperature detecting means detects the outlet temperature of the heat exchanger were described in the embodiments, but the invention is not limited to this configuration, and instead, the first pressure detecting means may detect the pressure in the refrigerant passage extending from the condenser to the refrigerant pump, the first temperature detecting means may detect the temperature in the refrigerant passage extending from the condenser to the refrigerant pump, the second pressure detecting means may detect the pressure in the refrigerant passage extending from the heat exchanger to the expansion device, and the second temperature detecting means may detect the temperature in the refrigerant passage extending from the heat exchanger to the expansion device.

DESCRIPTION OF REFERENCE NUMERALS 1 engine-driven vehicle
1' hybrid vehicle
2 engine
2a crank pulley (part of transmission mechanism)
31 Rankine cycle
32 refrigerant pump
33 pump pulley (part of transmission mechanism)
34 belt (part of transmission mechanism)
35 expansion device clutch (electromagnetic clutch)
36 heat exchanger
37 expansion device
38 condenser
38' water-cooled condenser (liquid-cooled condenser)
62 expansion device upstream valve
66 bypass valve
71 engine controller
72 pressure sensor (second pressure detecting means)
73 pressure sensor (first pressure detecting means)
81 temperature sensor (first temperature detecting means)
82 temperature sensor (second temperature detecting means)

The invention claimed is:

1. An apparatus for utilizing heat wasted from an engine, comprising:
a Rankine cycle including:
a heat exchanger that recovers heat wasted from the engine in a refrigerant;
an expansion device that generates power using the refrigerant at an outlet of the heat exchanger;
a condenser that condenses the refrigerant exiting the expansion device; and
a refrigerant pump that is driven by power regenerated by the expansion device so as to supply the refrigerant exiting the condenser to the heat exchanger;
a transmission mechanism configured to couple a shaft to a rotary shaft of the engine via an electromagnetic clutch, the refrigerant pump and the expansion device being disposed on the shaft as an identical shaft, the electromagnetic clutch being configured to be engaged and disengaged;
first pressure detecting means for detecting a pressure in a refrigerant passage, the refrigerant passage extending from the condenser to the refrigerant pump;
first temperature detecting means for detecting a temperature in the refrigerant passage, the refrigerant passage extending from the condenser to the refrigerant pump;
second pressure detecting means for detecting a pressure in a refrigerant passage, the refrigerant passage extending from the heat exchanger to the expansion device;
second temperature detecting means for detecting a temperature in the refrigerant passage, the refrigerant passage extending from the heat exchanger to the expansion device;
control means that uses detection values detected by these four detecting means when operating the Rankine cycle; and
sticking diagnosis means for diagnosing whether the electromagnetic clutch is stuck in an engaged condition or not on the basis of the pressure and the temperature detected by either a couple constituted by the first pressure detecting means and the first temperature detecting means or a couple constituted by the second pressure detecting means and the second temperature detecting means.

2. The apparatus for utilizing heat wasted from an engine as defined in claim 1,
wherein a degree of subcool of the refrigerant is calculated on the basis of the pressure and the temperature detected by the couple constituted by the first pressure detecting means and the first temperature detecting means, and
wherein the sticking diagnosis means diagnoses that the electromagnetic clutch is stuck in the engaged condition when the calculated degree of subcool exceeds a predetermined value defined in advance.

3. The apparatus for utilizing heat wasted from an engine as defined in claim 1,
wherein a degree of superheat of the refrigerant is calculated on the basis of the pressure and the temperature detected by the couple constituted by the second pressure detecting means and the second temperature detecting means, and
wherein the sticking diagnosis means diagnoses that the electromagnetic clutch is stuck in the engaged condition when the calculated degree of superheat exceeds a predetermined value defined in advance.

4. The apparatus for utilizing heat wasted from an engine as defined in claim 1,
wherein the first pressure detecting means detects an inlet pressure of the refrigerant pump, and the first temperature detecting means detects an inlet temperature of the refrigerant pump.

5. The apparatus for utilizing heat wasted from an engine as defined in claim 1,
wherein the second pressure detecting means detects an outlet pressure of the heat exchanger, and the second temperature detecting means detects an outlet temperature of the heat exchanger.

6. The apparatus for utilizing heat wasted from an engine as defined in claim 1,
wherein the diagnosis is performed when a condition for driving the refrigerant pump is not satisfied.

* * * * *